US010427335B2

(12) United States Patent
Akita

(10) Patent No.: US 10,427,335 B2
(45) Date of Patent: Oct. 1, 2019

(54) DEVICE FOR MANUFACTURING UNEVEN-THICKNESS FILM, AND METHOD FOR MANUFACTURING UNEVEN-THICKNESS FILM

(71) Applicants: MITSUBISHI GAS CHEMICAL COMPANY, INC., Tokyo (JP); MGC FILSHEET CO., LTD., Saitama (JP)

(72) Inventor: Reiki Akita, Tokyo (JP)

(73) Assignees: MITSUBISHI GAS CHEMICAL COMPANY, INC., Tokyo (JP); MGC FILSHEET CO., LTD., Saitama (JP)

(*) Notice: Subject to any disclaimer, the term of this patent is extended or adjusted under 35 U.S.C. 154(b) by 189 days.

(21) Appl. No.: 15/103,512

(22) PCT Filed: Nov. 20, 2014

(86) PCT No.: PCT/JP2014/080827
§ 371 (c)(1),
(2) Date: Jun. 10, 2016

(87) PCT Pub. No.: WO2015/093227
PCT Pub. Date: Jun. 25, 2015

(65) Prior Publication Data
US 2016/0311137 A1    Oct. 27, 2016

(30) Foreign Application Priority Data

Dec. 20, 2013 (JP) .................. 2013-263393

(51) Int. Cl.
*B29C 43/46* (2006.01)
*B29C 48/00* (2019.01)
(Continued)

(52) U.S. Cl.
CPC .......... *B29C 43/46* (2013.01); *B29C 48/0011* (2019.02); *B29C 48/08* (2019.02); *B29C 48/12* (2019.02); *B29D 11/00663* (2013.01); *G02B 6/002* (2013.01); *G02B 6/0065* (2013.01); *B29C 43/24* (2013.01); *B29C 48/914* (2019.02); *B29C 2043/463* (2013.01);
(Continued)

(58) Field of Classification Search
None
See application file for complete search history.

(56) References Cited

U.S. PATENT DOCUMENTS 5,030,079 A    7/1991  Benzing
5,174,845 A *  12/1992 Petty ............... B26D 3/003
                                              156/184
(Continued)

FOREIGN PATENT DOCUMENTS

JP    4-353894    12/1992
JP    9-222514    8/1997
(Continued)

OTHER PUBLICATIONS

JP2010058437A Google Machine Translation performed May 29, 2018. (Year: 2018).*
(Continued)

*Primary Examiner* — Lisa L Herring
(74) *Attorney, Agent, or Firm* — Greenblum & Bernstein, P.L.C.

(57) ABSTRACT

The manufacturing device is provided with a first roller and a second roller for molding an uneven-thickness film. The first roller is provided with a truncated-cone-shaped portion and a disc-shaped portion, the diameter of the disc-shaped portion is larger than the diameter of a large-diameter face of the truncated-cone-shaped portion, and the second roller is provided with a column-shaped portion. A thick part is formed in a molded body of the uneven-thickness film between the truncated-cone-shaped portion of the first roller and the column-shaped portion of the second roller, and a thin connecting part is formed in the molded body between the disc-shaped portion of the first roller and the column-shaped portion of the second roller.

7 Claims, 4 Drawing Sheets

(51) Int. Cl.
- *B29D 11/00* (2006.01)
- *B29C 48/08* (2019.01)
- *B29C 48/12* (2019.01)
- *B29C 43/24* (2006.01)
- *F21V 8/00* (2006.01)
- *B29K 33/00* (2006.01)
- *B29K 69/00* (2006.01)
- *B29L 11/00* (2006.01)
- *B29C 48/88* (2019.01)

(52) U.S. Cl.
CPC .. *B29C 2043/466* (2013.01); *B29C 2793/009* (2013.01); *B29C 2793/0063* (2013.01); *B29K 2033/00* (2013.01); *B29K 2069/00* (2013.01); *B29K 2995/0026* (2013.01); *B29L 2011/0075* (2013.01)

(56) References Cited

U.S. PATENT DOCUMENTS

| | | | |
|---|---|---|---|
| 2006/0062868 A1 | 3/2006 | Pan et al. | |
| 2009/0071598 A1 | 3/2009 | Takada et al. | |
| 2010/0020568 A1 | 1/2010 | Iwasaki et al. | |

FOREIGN PATENT DOCUMENTS

| | | |
|---|---|---|
| JP | 2004-82359 | 3/2004 |
| JP | 2006-59763 | 3/2006 |
| JP | 2006-88649 | 4/2006 |
| JP | 2010-58437 | 3/2010 |
| WO | 2008/093556 | 8/2008 |
| WO | 2008/123559 | 10/2008 |

OTHER PUBLICATIONS

JP-2010058437A English Translation Performed by Schreiber Translations Jun. 2018. (Year: 2018).*

International Search Report issued in Japanese Patent Application No. PCT/JP2014/080827, dated Feb. 10, 2015.

Extended European Search Report issued in Patent Application No. 14871003.1, dated Jul. 31, 2017.

Official Communication issued in European Patent Office (EPO) Patent Application No. 148 710 03.1, dated Feb. 20, 2019.

\* cited by examiner

DEVICE FOR MANUFACTURING UNEVEN-THICKNESS FILM, AND METHOD FOR MANUFACTURING UNEVEN-THICKNESS FILM

TECHNICAL FIELD

The present invention relates to a device and a method for manufacturing an uneven-thickness film made of a synthetic resin, for example, an uneven-thickness film used as a light guide plate for a back irradiating device of a liquid crystal display device.

BACKGROUND ART

A liquid crystal display device such as a tablet PC, a smartphone or the like employs a light guide plate (light guide film) of an edge light type as a back lighting device. An edge-light-type light guide plate emits light incident on one edge (light incident surface) of the transparent square plate from its surface (light emitting surface). A back lighting device has a light source arranged on at least one edge of the light guide plate. The surface opposing the light emitting surface of the light guide plate (light-reflecting surface) comprises an element for changing the advancing angle of the light transmitting the light guide plate (hereinafter, referred to as a "polarizing element"). Light incident on the light incident surface of the light guide plate is reflected by the light-reflecting surface, by which the advancing direction of the light is changed and the light propagates within the light guide plate and emits from the light emitting surface. In general, the light guide plate comprises a polarizing element whose density distribution and shape is determined such that the brightness of the light is uniform over the entire light emitting surface.

A method for manufacturing such a light guide plate is generally an injection molding method like the method disclosed in Japanese Unexamined Patent Application Publication No. Heisei 9-222514. A light guide plate manufactured by an injection molding method is restricted in thinning the plate thickness due to limitations in fluidity, moldability and the like, and thus the thinner side of the plate thickness is 0.3-0.4 mm at the thinnest. In addition, since the size of the light guide plate is increased along with the increase in the size of the liquid crystal screens, a larger injection molding machine is necessary, which is associated with problems such as an increase in the manufacturing cost, requirements of excessive pressure, relatively long pressurizing time and cooling time to ensure the transfer accuracy, and the like.

As a method for solving such problems, a method for manufacturing an uneven-thickness film with an extruder has been proposed, in which at least two uneven-thickness films are extruded and integrally molded such that they are symmetrically arranged side by side, like the method disclosed in Japanese Unexamined Patent Application Publication No. 2004-82359.

According to the manufacturing method like one disclosed in Japanese Unexamined Patent Application Publication No. 2004-82359, however, the shape of the extrusion die port of the extruding device needs to correspond to the shape of the desired uneven-thickness film. Moreover, in order to obtain a light guide film, the uneven-thickness films that are symmetrically arranged side by side need to be cut off from each other, which requires the end face of the cut part to be carefully polished to be used as a light incident surface.

PRIOR ART DOCUMENTS

Patent Documents

Patent Document 1: Japanese Unexamined Patent Application Publication No. Heisei 9-222514
Patent Document 2: Japanese Unexamined Patent Application Publication No. 2004-82359

SUMMARY OF THE INVENTION

Problem to be Solved by the Invention

The present invention was made in light of the above-described circumstances. Specifically, the present invention has an objective of providing a device and a method for manufacturing an uneven-thickness film, which can mold an uneven-thickness film without changing the shape of an extrusion die port of an extruding device from a substantially rectangular shape that is the same as the one used for usual film molding. In addition, the present invention has an objective of providing a device and a method for manufacturing an uneven-thickness film, wherein a light guide film can easily be made only by dividing (cutting) the manufactured uneven-thickness film in a direction substantially vertical to the extruding direction.

Means for Solving the Problem

In order to solve the above-described problem, the present invention is constituted as follows.

(Aspect 1) A device for manufacturing an uneven-thickness film comprising a first roller and a second roller for molding the uneven-thickness film, wherein: the first roller comprises a truncated-cone-shaped portion and a disc-shaped portion; the diameter of the disc-shaped portion is larger than the diameter of the larger-diameter face of the truncated-cone-shaped portion; and the second roller comprises a column-shaped portion. (Aspect 2) The manufacturing device according to Aspect 1, wherein the manufacturing device forms a thick part to the molded body of the uneven-thickness film between the truncated-cone-shaped portion of the first roller and the column-shaped portion of the second roller, and forms a thin connecting portion to the molded body between the disc-shaped portion of the first roller and the column-shaped portion of the second roller. (Aspect 3) The manufacturing device according to Aspect 1 or 2, wherein portions where the disc-shaped portion of the first roller opposes the column-shaped portion of the second roller are substantially parallel. (Aspect 4) The manufacturing device according to Aspect 2 or 3, wherein the truncated-cone-shaped portion is a pair of truncated-cone-shaped portions, and the pair of truncated-cone-shaped portions are symmetrically arranged to sandwich the disc-shaped portion. (Aspect 5) The manufacturing device according to any one of Aspects 1-4, wherein the portions constituting the first roller are integrally arranged on the same axis. (Aspect 6) The manufacturing device according to any one of Aspects 2-5, wherein the disc-shaped portion connects with the smaller-diameter face of the truncated-cone-shaped portion. (Aspect 7) The manufacturing device according to any one of Aspects 1-6, wherein the first roller further comprises a column-shaped portion.

(Aspect 8) The manufacturing device according to Aspect 7, wherein the column-shaped portion of the first roller connects with the larger-diameter face of the truncated-cone-shaped portion of the first roller. (Aspect 9) A device for manufacturing an uneven-thickness film comprising a first roller and a second roller for molding the uneven-thickness film, wherein: the first roller comprises a column-shaped portion and a disc-shaped portion; the second roller comprises a truncated-cone-shaped portion and a disc-shaped small-diameter portion; and the small-diameter portion gently connects with the truncated-cone-shaped portion on the smaller-diameter face side. (Aspect 10) The manufacturing device according to Aspect 9, wherein the manufacturing device forms a thick part to the molded body of the uneven-thickness film between the column-shaped portion of the first roller and the truncated-cone-shaped portion of the second roller, and forms a thin connecting portion to the molded body between the disc-shaped portion of the first roller and the small-diameter portion of the second roller. (Aspect 11) The manufacturing device according to Aspect 9 or 10, wherein portions where the disc-shaped portion of the first roller opposes the small-diameter portion of the second roller are substantially parallel. (Aspect 12) The manufacturing device according to any one of Aspects 9-11, wherein the truncated-cone-shaped portion is a pair of truncated-cone-shaped portions, and the pair of truncated-cone-shaped portions are symmetrically arranged to sandwich the small-diameter portion. (Aspect 13) The manufacturing device according to any one of Aspects 9-12, wherein the portions constituting the first roller or the second roller are integrally arranged on the same axis. (Aspect 14) The manufacturing device according to any one of Aspects 9-13, wherein the small-diameter portion connects with the smaller-diameter face of the truncated-cone-shaped portion. (Aspect 15) The manufacturing device according to any one of Aspects 9-14, wherein the second roller further comprises a column-shaped portion. (Aspect 16) The manufacturing device according to Aspect 15, wherein the column-shaped portion of the second roller is connected with the larger-diameter face of the truncated-cone-shaped portion of the second roller.

(Aspect 17) The manufacturing device according to Aspect 2 or 10, wherein the thick part of the molded body is formed such that the film thickness thereof changes from one side part to the other side part that are parallel to the extruding direction. (Aspect 18) The manufacturing device according to any one of Aspects 1-16, wherein the surface of the truncated-cone-shaped portion comprises a dot pattern. (Aspect 19) The manufacturing device according to any one of Aspects 1-18, comprising a cutter section for cutting the molded body molded with the first roller and the second roller. (Aspect 20) The manufacturing device according to any one of Aspects 2, 10 and 17, wherein the molded body of the uneven-thickness film consists of multiple molded sub-bodies which are connected via the connecting portions.

(Aspect 21) A method for manufacturing an uneven-thickness film using a first roller and a second roller for molding the uneven-thickness film, wherein: the first roller comprises a truncated-cone-shaped portion and a disc-shaped portion; the diameter of the disc-shaped portion is larger than the diameter of the larger-diameter face of the truncated-cone-shaped portion; and the second roller comprises a column-shaped portion, the method comprising the steps of: forming a thick part to the molded body of the uneven-thickness film between the truncated-cone-shaped portion of the first roller and the column-shaped portion of the second roller; and forming a thin connecting portion to the molded body between the disc-shaped portion of the first roller and the column-shaped portion of the second roller. (Aspect 22) A method for manufacturing an uneven-thickness film using a first roller and a second roller for molding the uneven-thickness film, wherein: the first roller comprises a column-shaped portion and a disc-shaped portion; the second roller comprises a truncated-cone-shaped portion and a small-diameter portion; and the diameter of the small-diameter portion is smaller than the diameter of the smaller-diameter face of the truncated-cone-shaped portion, the method comprising the steps of: forming a thick part to the molded body of the uneven-thickness film between the column-shaped portion of the first roller and the truncated-cone-shaped portion of the second roller; and forming a thin connecting portion to the molded body between the disc-shaped portion of the first roller and the small-diameter portion of the second roller. (Aspect 23) The manufacturing method according to Aspect 21 or 22, wherein the connecting portion is formed to have a substantially uniform thickness.

(Aspect 24) A device for manufacturing an uneven-thickness film comprising a first roller and a second roller for molding the uneven-thickness film, wherein: (i) the first roller comprises a truncated-cone-shaped portion and a disc-shaped portion, where the diameter of the disc-shaped portion is larger than the diameter of the larger-diameter face of the truncated-cone-shaped portion, and the second roller comprises a column-shaped portion; or (ii) the first roller comprises a column-shaped portion and a disc-shaped portion, and the second roller comprises a truncated-cone-shaped portion and a disc-shaped small-diameter portion, wherein the small-diameter portion gently connects with the truncated-cone-shaped portion on the smaller-diameter face side.

(Aspect 25) A method for manufacturing an uneven-thickness film using a first roller and a second roller for molding the uneven-thickness film, wherein: (i) the first roller comprises a truncated-cone-shaped portion and a disc-shaped portion, where the diameter of the disc-shaped portion is larger than the diameter of the larger-diameter face of the truncated-cone-shaped portion, and the second roller comprises a column-shaped portion, the method comprising the steps of: forming a thick part to the molded body of the uneven-thickness film between the truncated-cone-shaped portion of the first roller and the column-shaped portion of the second roller; and forming a thin connecting portion to the molded body between the disc-shaped portion of the first roller and the column-shaped portion of the second roller; or (ii) the first roller comprises a column-shaped portion and a disc-shaped portion, and the second roller comprises a truncated-cone-shaped portion and a small-diameter portion, wherein the diameter of the small-diameter portion is smaller than the diameter of the smaller-diameter face of the truncated-cone-shaped portion, the method comprising the steps of: forming a thick part to the molded body of the uneven-thickness film between the column-shaped portion of the first roller and the truncated-cone-shaped portion of the second roller; and forming a thin connecting portion to the molded body between the disc-shaped portion of the first roller and the small-diameter portion of the second roller.

Effect of the Invention

The present invention is capable of manufacturing an uneven-thickness film that can easily be divided, continuously with first and second rollers without changing a shape of an extrusion die port.

MODES FOR CARRYING OUT THE INVENTION

Figure 1:
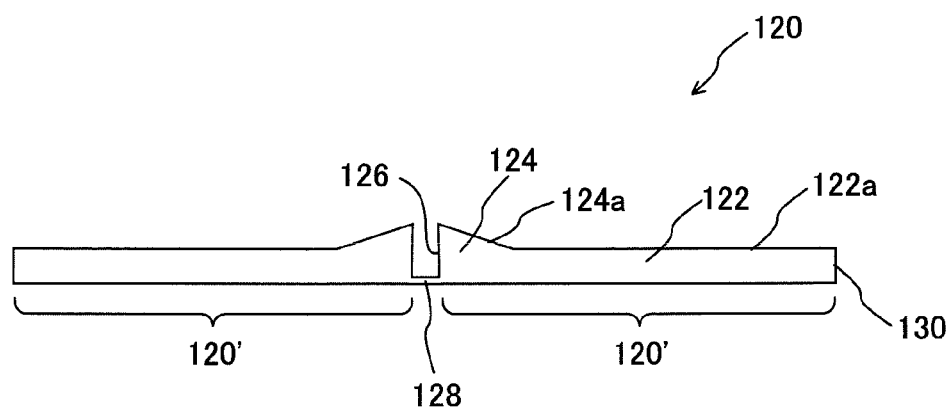
FIG. 1 A cross-sectional view of an uneven-thickness film manufactured in a first embodiment of the present invention.

Embodiments of a device and a method for manufacturing an uneven-thickness film according to the present invention will be described with reference to the drawings. In each figure, like parts are denoted by like reference numerals and the description thereof is omitted.

First Embodiment

FIG. 1 is a cross-sectional view of a molded body of an uneven-thickness film extruded by a manufacturing device and a method of a first embodiment, shown in a direction vertical to the extruding (longitudinal) direction. The molded body 120 consists of two molded sub-bodies 120'. The molded sub-body 120' comprises a flat portion 122 that has a uniform film thickness, an uneven-thickness portion 124 whose film thickness changes, and a connecting portion 128 whose film thickness is thinner than the flat portion 122. Preferably, the connecting portion 128 can be formed to have a substantially uniform film thickness between a disc-shaped portion 232 of a first roller 230 and a column-shaped portion of a second roller 240 which will be described later. The top surface of the molded body 120' is formed to rise on the uneven-thickness portion 124 side while the bottom surface of the molded body 120' is formed to be flat. The thickness (film thickness) of the uneven-thickness portion 124 decreases from the first side part 126 on the connecting portion 128 side towards the second side part 130 on the flat portion 122 side. The side parts 126 of the two uneven-thickness portions 124 oppose to each other via the connecting portion 128. The connecting portion 128 is formed on the bottom surface side of the molded bodies 120'.

Figure 2:
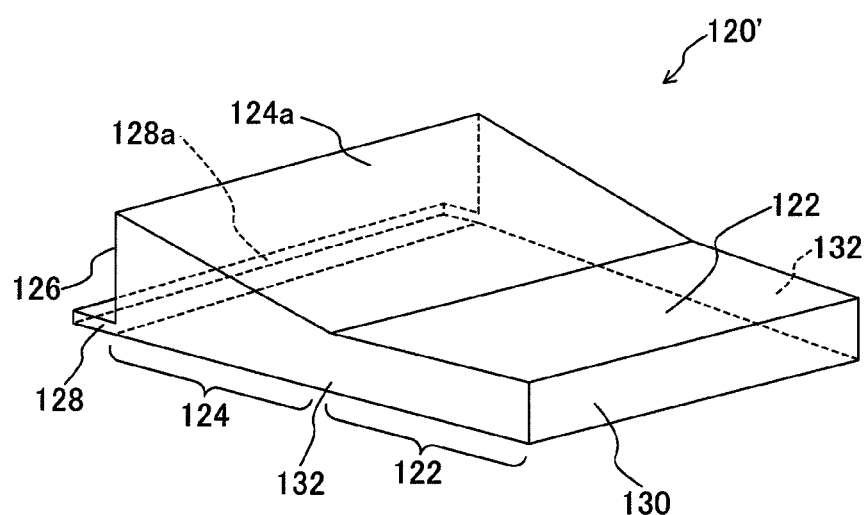
FIG. 2 A perspective view showing a molded sub-body of the uneven-thickness film shown in FIG. 1.

FIG. 2 is a perspective view showing a molded sub-body 120' obtained by cutting the molded body 120 of the uneven-thickness film shown in FIG. 1. The molded sub-body 120' is cut along the cut plane 128a of the connecting portion 128 parallel to the extruding direction, and also cut along two cut planes 132 that is vertical to the extruding direction.

According to the first embodiment, the two molded sub-bodies 120' are integrally molded to be symmetrically arranged side by side such that the side parts 126 thereof oppose each other as shown in FIG. 1. Alternatively, multiple molded bodies including these two molded sub-bodies 120' may integrally be molded to be arranged side by side by connecting the side parts 130 via connecting portions. The entire connecting portion 128 is cut off from the molded sub-body 120' to use the resultant as a light guide film.

Referring to FIG. 2, the side part 126 serves as a light incident surface, the side part 130 serves as an end face, the sloped surface 124a of the uneven-thickness portion 124 serves as a light-reflecting surface, and the upper planar surface of the flat portion 122 serves as a light emitting surface. The sloped surface 124a as the light-reflecting surface is formed with a dot pattern that reflects light as will be described later.

Figure 3:
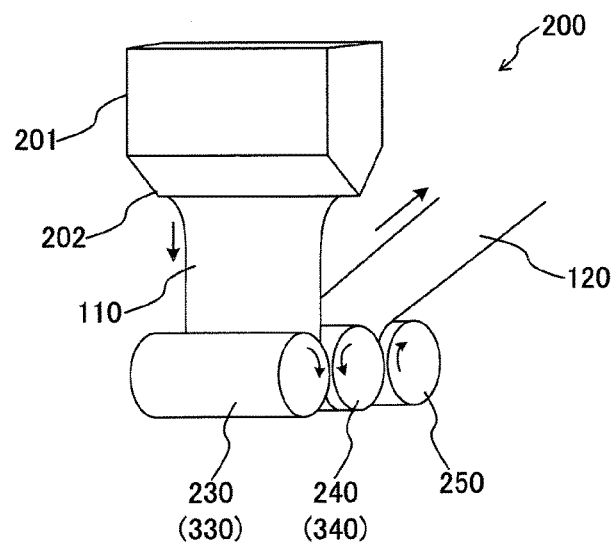
FIG. 3 A part perspective view showing a manufacturing device according to the first embodiment of the present invention.

FIG. 3 is a part perspective view of a manufacturing device 200 for molding the molded body of the uneven-thickness film shown in FIG. 1. The manufacturing device 200 comprises a die 201 for accommodating and extruding a resin, a rectangular-shaped extrusion port 202 formed on the die 201, a first roller 230, a second roller 240 and a third roller 250. The first and second rollers 230 and 240 are arranged beneath the extrusion port 202, and arranged to sandwich a pre-molded resin plate 110 extruded from the extrusion port 202. The third roller 250 is arranged next to the second roller 240.

Figure 4:
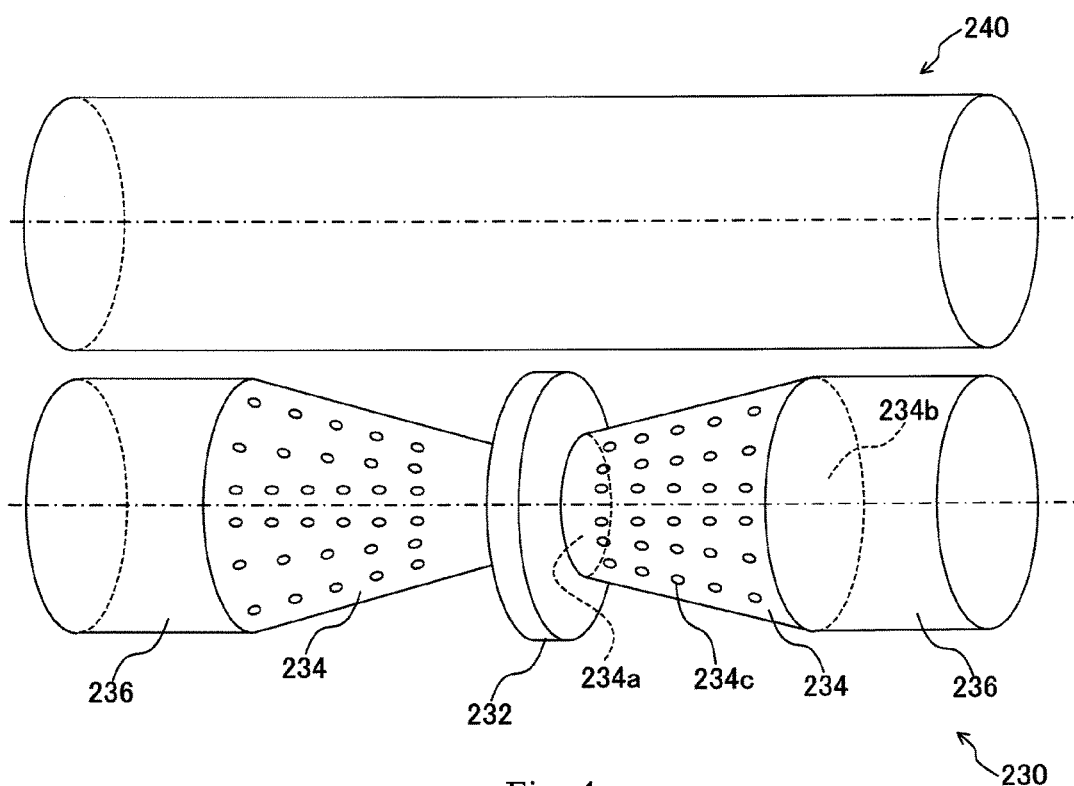
FIG. 4 A top perspective view showing the first and second rollers of the manufacturing device shown in FIG. 3.

With reference to FIG. 4, the structures of the first roller 230 and the second roller 240 will be described. The first roller 230 consists of a disc-shaped portion 232, a pair of truncated-cone-shaped portions 234 that sandwich the disc-shaped portion 232, and a pair of column-shaped portions 236 arranged outside the respective pair of truncated-cone-shaped portions 234. The respective portions of the first roller 230 are integrally arranged such that their rotation centers are positioned along the same axis. The pair of truncated-cone-shaped portions 234 are symmetrically arranged with respect to the disc-shaped portion 232 with the smaller-diameter faces 234a facing inside and the larger-diameter faces 234b facing outside. The diameter of the disc-shaped portion 232 is larger than the diameter of the larger-diameter face 234a of the truncated-cone-shaped portion 234. The second roller 240 and the third roller 250 are column-shaped portions as a whole, where the rotation center axis lines of the first to third rollers 230, 240 and 250 are arranged in parallel. Preferably, the portions where the disc-shaped portion 232 of the first roller 230 opposes the column-shaped portion of the second roller 240 are substantially parallel. Alternatively, the first roller 230 and the second roller 240 in FIGS. 3 and 4 may be arranged reversely. As shown in FIG. 4, the entire surface of the truncated-cone-shaped portion 234 comprises a dot pattern 234c, by which a light-reflecting surface is formed on the uneven-thickness portion 124. The second roller 240 and third roller 250 have smooth surfaces.

A process of molding a molded body of an uneven-thickness film with the manufacturing device 200 will be described. The manufacturing device 200 heats a resin as a material of a light guide film to a temperature that allows the resin to have a low viscosity with a heating means (not shown), and extrudes this resin as a resin plate 110 from the extrusion port 202 of the die 201. The resin plate 110 extruded from the extrusion port 202 is guided to the triple rollers, i.e., the first to third rollers 230, 240 and 250. The first and second rollers 230 and 240 shape the resin plate 110 to make a molded body 120. Specifically, as the resin plate 110 passes through the first and second rollers 230 and 240, the connecting portion 128 is formed between the disc-shaped portion 232 of the first roller 230 and the second roller 240, the uneven-thickness portion 124 is formed between the truncated-cone-shaped portion 234 of the first roller 230 and the second roller 240, and the flat portion 122 is formed between the column-shaped portion 236 of the first roller 230 and the second roller 240. With the dot pattern 234c of the truncated-cone-shaped portion 234, a dot pattern for light reflecting is formed on the resin plate.

Usually, the last third roller 250 is controlled to have a temperature that is lower than the glass-transition temperature of the resin that forms the molded body 120. Accordingly, at least the surface of the molded body 120 is solidified when the molded body 120 leaves the triple rollers. The molded body 120 that left the triple rollers continues to advance while being further cooled in the air, is divided in the longitudinal direction at a cutter section (not shown) with a slitter, an edge knife or the like, and is further divided and cut in the plate width direction with a push-cutter or the like, thereby forming a light guide film. Thus dots can be formed simultaneously with the molding of the plastic panel (molded body 120). Depending on the thickness or the width of the connecting portion 128 of the thin film shown in FIG. 1, dividing in the longitudinal direction may be omitted, in which case the molded body may be split to make light guide films at the stage of assembling the light guide film into a product. Furthermore, in the first embodiment, the disc-shaped portion 232 shown in FIG. 4 may be omitted. In this case, the center part of the thickness of the molded body 120 of the uneven-thickness film can be cut to make light guide films.

Second Embodiment

Figure 5:
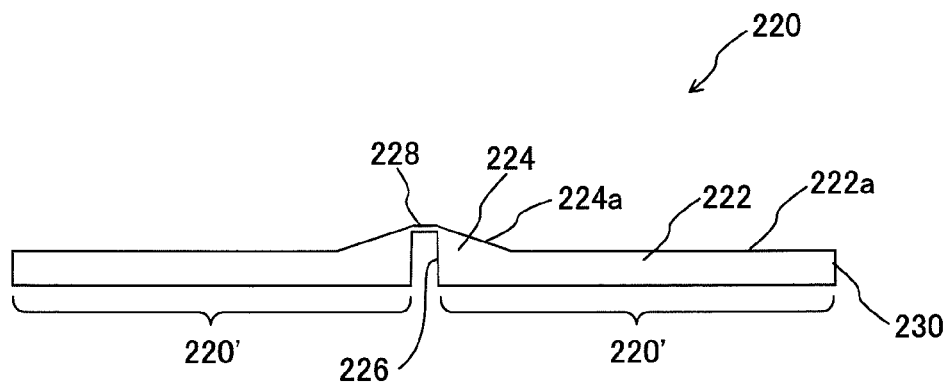
FIG. 5 A cross-sectional view of an uneven-thickness film manufactured in a second embodiment of the present invention.

FIG. 5 is a cross-sectional view of a molded body of an uneven-thickness film extruded by a manufacturing device and a method of the second embodiment, shown in a direction vertical to the extruding direction. The molded body 220 consists of two molded sub-bodies 220'. The molded sub-body 220' comprises a flat portion 222 that has a uniform film thickness, an uneven-thickness portion 224 whose film thickness changes, and a connecting portion 228 whose film thickness is thinner than the flat portion 222. The top surface of the molded body 220' is formed to rise on the uneven-thickness portion 224 side while the bottom surface of the molded body 220' is formed to be flat. The thickness (film thickness) of the uneven-thickness portion 224 decreases from the first side part 226 on the connecting portion 228 side towards the second side part 230 on the flat portion 232 side. The side parts 126 of the two uneven-thickness portions 224 oppose to each other via the connecting portion 228. The connecting portion 228 is formed on the top surface side of the rising molded body 120'. Preferably, the connecting portion 228 can be formed to have a substantially uniform film thickness between a disc-shaped portion 332 of the first roller 330 and a small-diameter portion 342 of the second roller 340 which will be described later.

Figure 6:
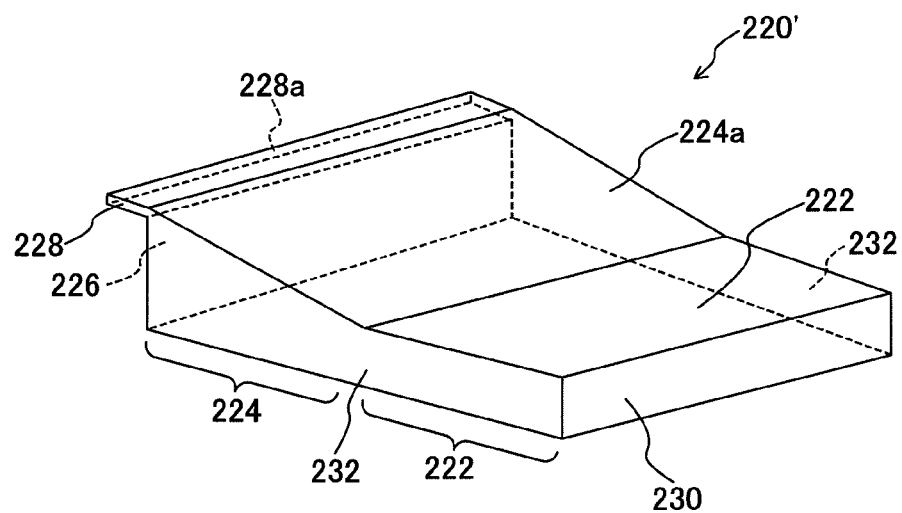
FIG. 6 A perspective view showing a molded sub-body of the uneven-thickness film shown in FIG. 5.

FIG. 6 is a perspective view showing the molded sub-body 220' obtained by cutting the molded body 220 of the uneven-thickness film shown in FIG. 5. The molded sub-bodies 220' are cut along a cut plane 228a of the connecting portion 228 that is parallel to the extruding direction, and also cut along two cut planes 232 that are vertical to the extruding direction.

According to the second embodiment, the two molded sub-bodies 220' are integrally molded to be symmetrically arranged side by side such that the side parts 226 thereof oppose each other as shown in FIG. 5. Alternatively, multiple molded bodies including these two molded sub-bodies 220' may integrally be molded to be arranged side by side by connecting the side parts 230 via connecting portions. The entire connecting portion 228 is cut off from the molded sub-body 220' to use the resultant as a light guide film.

Referring to FIG. 6, the side part 226 serves as a light incident surface, the side part 230 serves as an end face, the sloped surface 224a of the uneven-thickness portion 224 serves as a light-reflecting surface, and the upper planar surface of the flat portion 232 serves as a light emitting surface 232a. The sloped surface 224a as the light-reflecting surface is formed with a dot pattern.

In the second embodiment, a manufacturing device for molding a molded body of an uneven-thickness film is similar to the manufacturing device 200 of the first embodiment (FIG. 3). Only the first roller and the second roller of the manufacturing device of the second embodiment have structures different from those of the manufacturing device 200. Hereinafter, the first roller 330 and the second roller 340 used for the manufacturing device of the second embodiment will be described.

Figure 7:
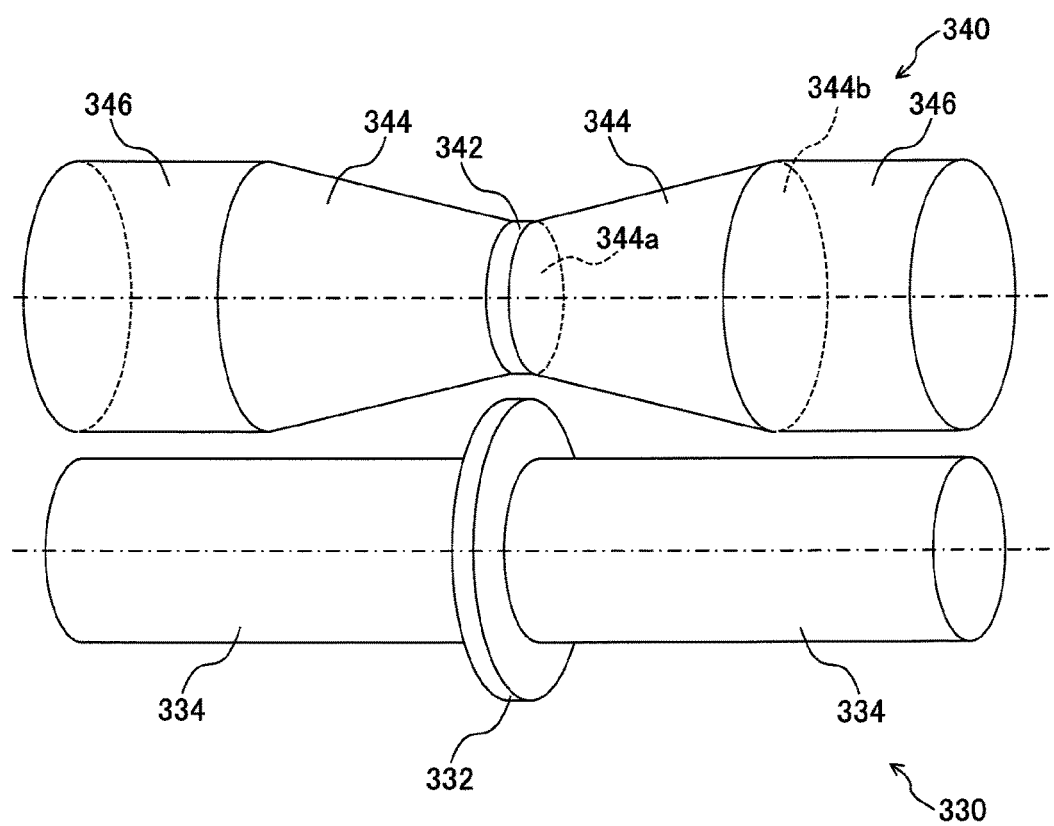
FIG. 7 A top perspective view showing first and second rollers of a manufacturing device according to the second embodiment of the present invention.

As shown in FIG. 7, the first roller 330 consists of a disc-shaped portion 332, and a pair of column-shaped portions 334 that sandwich the disc-shaped portion 332. The respective portions of the first roller 330 are integrally arranged such that their rotation centers are positioned along the same axis. The diameter of the disc-shaped portion 332 is larger than the diameter of the column-shaped portion 334. The second roller 340 consists of a disc-shaped small-diameter portion 342, a pair of truncated-cone-shaped portions 344 sandwiching the small-diameter portion 342, and a pair of column-shaped portions 346 arranged outside the pair of truncated-cone-shaped portions 344, respectively. The pair of truncated-cone-shaped portions 334 are symmetrically arranged to sandwich the small-diameter portion 342 with the smaller-diameter faces 334a facing inside and the larger-diameter faces 334b facing outside. The diameter of the smaller-diameter face 344a of the truncated-cone-shaped portion 344 is the same as the diameter of the small-diameter portion 342. The small-diameter portion 342 gently connects with the truncated-cone-shaped portion 344 on the smaller-diameter face 344a side. The diameter of the larger-diameter face 344b of the truncated-cone-shaped portion 344 is the same as the diameter of the column-shaped portion 346. Preferably, the portion where the disc-shaped portion 332 of the first roller 330 opposes the small-diameter portion 342 of the second roller 340 may be substantially parallel. Alternatively, the first roller 330 and the second roller 340 may be arranged reversely. Although it is not shown, the entire surface of the truncated-cone-shaped portion 334 comprises a dot pattern. The first roller 330 has a smooth surface.

A process of molding a molded body of an uneven-thickness film according to the second embodiment will be described. Steps that are the same as the molding steps of the first embodiment will be omitted. A resin plate 110 extruded from an extrusion port 202 of a die 201 is guided to triple rollers, i.e., the first to third rollers 330, 340 and 350. As the resin plate 110 passes through the first and second rollers 330 and 340, a connecting portion 228 is formed between the disc-shaped portion 332 of the first roller 340 and the small-diameter portion 342 of the second roller 340, an uneven-thickness portion 224 is formed between the inner part of the column-shaped portion 334 of the first roller 330 and the truncated-cone-shaped portion 344 of the second roller 340, and a flat portion 222 is formed between the outer part of the column-shaped portion 334 of the first roller 330 and the column-shaped portion 346 of the second roller 340. With the dot pattern of the truncated-cone-shaped portion 334, a dot pattern is formed on the resin plate. In the second embodiment, the disc-shaped portion 332 shown in FIG. 7 may be omitted. In this case, the center part of the thickness of the molded body 120 of the uneven-thickness film can be cut to make light guide films.

Although each embodiment was described using triple rollers, the number of rollers is not limited to three, and may be two, i.e., the first roller and the second roller, or four or more. In each embodiment, a transparent resin such as an acrylic resin, a polycarbonate resin or the like is used as an uneven-thickness film that is used for manufacturing a light guide film. In each embodiment, a polarizing element may be embossed onto the bottom surface of the molded body 120 or 220 using an indented embossing surface. As can be appreciated from the above description, the present invention is capable of continuously and inexpensively manufacturing an uneven-thickness film as a molded body having a shape with an uneven-cross-section as typified by a wedge-shaped light guide film.

DESCRIPTION OF REFERENCE NUMERALS

120 Molded body
124 Uneven-thickness portion
122 Flat portion
128 Connecting portion
200 Manufacturing device
201 Die
202 Extrusion port
230 First roller
240 Second roller
250 Third roller
232 Disc-shaped portion
234 Truncated-cone-shaped portion
236 Column-shaped portion
220 Molded body
224 Uneven-thickness portion
222 Flat portion
228 Connecting portion
330 First roller
340 Second roller
332 Disc-shaped portion
334 Column-shaped portion
342 Small-diameter portion
344 Truncated-cone-shaped portion
346 Column-shaped portion

The invention claimed is:

1. A device for manufacturing an uneven-thickness film comprising a first roller and a second roller for molding the uneven-thickness film, wherein:

the first roller comprises a column-shaped portion and a disc-shaped portion; the second roller comprises a truncated-cone-shaped portion and a disc-shaped small-diameter portion;

the disc-shaped small-diameter portion having a diameter the same as a smaller-diameter face side of the truncated-cone-shaped portion;

the disc-shaped small-diameter portion smoothly connects with the truncated-cone-shaped portion on the smaller-diameter face side of the truncated-cone-shaped portion; and a circumferential surface of the disc-shaped portion opposes a circumferential surface of the disc-shaped small-diameter portion and a thickness of the disc-shaped portion is substantially the same as a thickness of the disc-shaped small-diameter portion.

2. The manufacturing device according to claim 1, wherein:

the manufacturing device forms:
a thick part to the molded body of the uneven-thickness film between the column-shaped portion of the first roller and the truncated-cone-shaped portion of the second roller; and
a thin connecting portion to the molded body between the disc-shaped portion of the first roller and the disc-shaped small-diameter portion of the second roller.

3. The manufacturing device according to claim 1, wherein portions where the disc-shaped portion of the first roller opposes the disc-shaped small-diameter portion of the second roller are substantially parallel.

4. The manufacturing device according to claim 1, wherein:

the truncated-cone-shaped portion is a pair of truncated-cone-shaped portions; and
the pair of truncated-cone-shaped portions are symmetrically arranged to sandwich the disc-shaped small-diameter portion.

5. The manufacturing device according to claim 1, wherein the column shaped portion and the disc-shaped portion of the first roller or the truncated-cone-shaped portion and the disc-shaped small-diameter portion of the second roller are integrally arranged on the same axis.

6. The manufacturing device according to claim 1, wherein the second roller further comprises a column-shaped portion.

7. The manufacturing device according to claim 6, wherein the column-shaped portion of the second roller is connected with the larger-diameter face of the truncated-cone-shaped portion of the second roller.

* * * * *